S. DAVIS.
FILM FOR KINETOSCOPES OR MOVING PICTURE MACHINES.
APPLICATION FILED SEPT. 25, 1916.
1,271,673. Patented July 9, 1918.
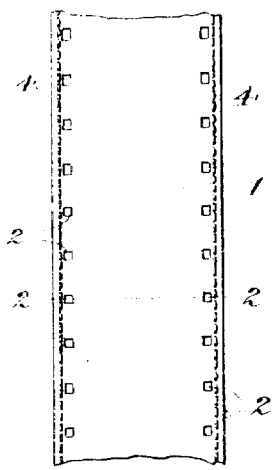
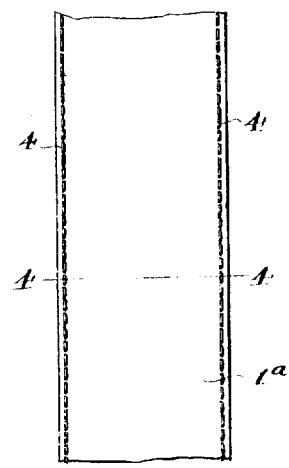
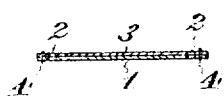
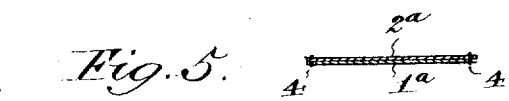
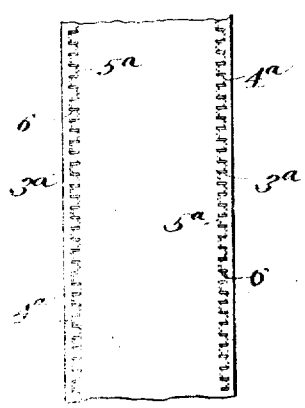
Inventor,
Samuel Davis
By Victor J. Evans
Attorney
Witnesses:
A. V. Doyle

UNITED STATES PATENT OFFICE.

SAMUEL DAVIS, OF NEW YORK, N. Y.

FILM FOR KINETOSCOPES OR MOVING-PICTURE MACHINES.

1,271,673.   Specification of Letters Patent.   Patented July 9, 1918.

Application filed September 25, 1916. Serial No. 122,159.

*To all whom it may concern:*

Be it known that I, SAMUEL DAVIS, a citizen of the United States, residing at New York, in the county of New York and State of New York, have invented new and useful Improvements in Films for Kinetoscopes or Moving-Picture Machines, of which the following is a specification.

This invention relates to films for kinetoscopes or moving picture machines and has for its principal object the provision of a flexible reinforcement running along a continuous line through the body of the film adjacent to the marginal edges thereof, the reinforcement being in the form of a tough flexible element stitched to the film and possessing certain natural qualities which will permit the same to be fully responsive to all of the usual movements of the film and at the same time designed and arranged so as to maximize the same for the life of the film and prevent the same from being torn while in use.

While the invention is particularly adapted for use in connection with films wherein sprocket openings are provided, I do not wish to limit myself thereto as it may be satisfactorily employed in connection with any transparent picture bearing tape or surface which is adapted to be drawn over the lens of a picture machine. I will therefore resort to certain modifications eliminating entirely the use of sprocket openings but including and combining therewith, my flexible reinforcement which will guard against side tearing or accidental snapping of the film.

A further object of the invention is to provide a protecting surface of transparent material which is normally separable or independent from the film and which is adapted to be extended over the sensitized surface of the film to protect the same against being scratched, scarred or otherwise marred and perhaps defaced while in use and/in combination with a protecting surface of this character, use is made of my flexible reinforcement having that primary office of a means for strengthening the body of the film and secondarily serving as a securing means for permanently attaching the protecting surface of the body of the film.

With the above and other objects in view which will appear as the nature of the invention is better understood, the same consists in the improved construction and novel arrangements of parts which will be hereinafter more fully described and particularly pointed out in the claims.

In the accompanying drawing, has been illustrated, several preferred forms of the invention, it being, however, understood, that no limitations are necessarily made to the precise structural details therein, exhibited, but that changes, alterations, and modifications within the scope of the claims may be resorted to when desired.

In the drawings:—

Figure 1 is a face view of a portion of a motion picture tape or film showing the application of my flexible reinforcement thereto.

Fig. 2 is a section on the line 2—2, of Fig. 1.

Fig. 3 is a view similar to Fig. 1, showing a slightly modified form of the invention.

Fig. 4 is a horizontal section taken on the line 4—4, of Fig. 3.

Fig. 5 is a face view showing a further modified form of the invention.

Fig. 6, is an edge view thereof.

With reference to the form of the invention shown in Fig. 1, it is seen that use is made of an ordinary film or body 1, such as the kind commonly employed in connection with motion picture apparatus. It is provided with longitudinal rows of sprocket openings 2, in order that the film may be moved intermittently over the exhibiting opening of the apparatus. The sensitized surface of the film is covered by a strip of suitable transparent material 3, having a width conforming with that of the film so that the edges of the latter come flush with the edges of the former. This strip is intended to preserve the sensitized surface of the film and protect the same against being scratched or otherwise marred or defaced as the film is drawn through the machine.

In practice, it is found that there is a strong tendency of the film cracking or tearing toward its center and along a lateral line of the sprocket openings 2, incident to the constant use of the film as it is drawn through the machine. Use is therefore made of a flexible reinforcement 4, which may be constructed of any suitable well known flexible material which will immediately adapt itself to the twisting and tortuous movements of the film and at the same time strengthen the same materially along continuous longitudinal lines outside of the sprocket openings and immediately adjacent thereto. This flexible reinforcement is stitched through the film proper and also through the protecting material 3, as shown in Fig. 2, so as to confine said material in a flat condition against the body of the film proper.

In the form of the invention shown in Fig. 3, the sprocket openings are entirely eliminated. The flexible reinforcement is stitched through the film proper shown at 1ª, and through the transparent protecting member shown at 2ª in Fig. 3. The flexible reinforcement is stitched to both of the described elements near the edges thereof so as to strengthen the film and prevent the same from tearing or from accidentally snapping while in use. The exposed leads of the stitching are projected beyond the face of the film and in use I contemplate providing a mechanism whereby the film can be intermittently or continuously drawn over the display openings of the exhibiting machine by friction. The friction of the film in the mechanism is maximized to a considerable extent by the mentioned leads of the stitching being exposed as described.

In the form of the invention shown in Figs. 5 and 6, the flexible reinforcement 3ª, is used in a manner somewhat similar to that described in the form shown in Figs. 3 and 4, and it includes longitudinal leads 4ª, and 5ª, which are relatively staggered by intervening transverse leads 6, the latter being exposed beyond the face of the film in order that the same may be used as a sprocket tooth, holding the same office as the usual sprocket opening which is specifically illustrated at 2 in the preferred embodiment of the invention. In this form the material employed in the stitching may be metallic, or any other tough and flexible material may be substituted if desired.

I claim:—

1. A moving picture film, a strip of transparent material overlying its sensitized surface, and lines of stitching along the edges of the film and through said material.

2. A moving picture film, a strip of transparent material overlying its sensitized surface, and lines of stitching along the edges of the film and through said material, the leads of the stitching projecting beyond the face of the film, for the purpose set forth.

3. The herein described motion film having lines of stitching along it parallel with and near both edges and with their leads projecting beyond its surface, for the purpose set forth.

4. In a motion picture film, a line of stitching along each edge thereof, each line including longitudinal stitches staggered with each other in two parallel rows and intervening transverse leads connecting them, for the purpose set forth.

In testimony whereof I affix my signature.

SAMUEL DAVIS.